US008014675B2

(12) United States Patent
Sarashina et al.

(10) Patent No.: US 8,014,675 B2
(45) Date of Patent: Sep. 6, 2011

(54) PASSIVE OPTICAL NETWORK COMMUNICATION METHOD AND SYSTEM

(75) Inventors: Masahiro Sarashina, Tokyo (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 713 days.

(21) Appl. No.: 12/081,631

(22) Filed: Apr. 18, 2008

(65) Prior Publication Data

US 2009/0232499 A1  Sep. 17, 2009

(30) Foreign Application Priority Data

May 31, 2007  (JP) .................................. 2007-144421

(51) Int. Cl.
*H04B 10/00* (2006.01)

(52) U.S. Cl. ................. 398/72; 398/74; 398/77; 398/52

(58) Field of Classification Search ............... 398/77–78
See application file for complete search history.

(56) References Cited

U.S. PATENT DOCUMENTS

| | | | | |
|---|---|---|---|---|
| 5,504,606 | A | * | 4/1996 | Frigo ............................... 398/58 |
| 6,937,617 | B2 | * | 8/2005 | Rakib et al. .................... 370/485 |
| 7,031,344 | B2 | * | 4/2006 | Rakib et al. .................... 370/479 |
| 7,239,650 | B2 | * | 7/2007 | Rakib et al. .................... 370/480 |
| 7,272,318 | B2 | * | 9/2007 | Lee et al. ......................... 398/78 |
| 7,330,656 | B2 | * | 2/2008 | Lee et al. ......................... 398/78 |
| 7,548,548 | B2 | * | 6/2009 | Rakib et al. .................... 370/419 |
| 7,609,967 | B2 | * | 10/2009 | Hochbaum et al. ............. 398/67 |
| 2001/0033611 | A1 | * | 10/2001 | Grimwood et al. ........... 375/219 |
| 2002/0136232 | A1 | | 9/2002 | Dudziak et al. |
| 2003/0208772 | A1 | * | 11/2003 | Milbrandt ..................... 725/114 |
| 2005/0041972 | A1 | * | 2/2005 | Kim et al. ........................ 398/78 |
| 2009/0202246 | A1 | * | 8/2009 | Kashima ......................... 398/77 |
| 2009/0232499 | A1 | * | 9/2009 | Sarashina et al. ............... 398/63 |

FOREIGN PATENT DOCUMENTS

| | | |
|---|---|---|
| EP | 0809372 A2 | 11/1997 |
| EP | 1458214 A2 | 9/2004 |
| EP | 1475915 A2 | 11/2004 |
| JP | 08-237239 | 9/1996 |
| JP | 2001-512919 | 2/2001 |
| JP | 2004-282742 | 10/2004 |
| WO | WO-03/017545 A1 | 2/2003 |
| WO | WO-2007/095813 A1 | 8/2007 |

OTHER PUBLICATIONS

McGregor et al. "Implementation of a TDM Passive Optical Network for Subscriber Loop Applications" Nov. 1989, pp. 1752-1758, vol. 7, No. 11, Journal of Lightwave Technology.

Tanaka et al., GE-PON OLT/ONU isshin hikari toranshiba no kaihatsu ("Development of an Optical Transceiver for a Single-Fiber GE-PON OLT/ONU"), Oki Technical Review, Issue 197, vol. 71, No. 1, Jan. 2004.

(Continued)

*Primary Examiner* — Agustin Bello
(74) *Attorney, Agent, or Firm* — Rabin & Berdo, P.C.

(57) ABSTRACT

A passive optical network communication system transmits an optical time-division multiplexed signal from a central office through a passive optical coupler to a number of subscribers, and transmits optical encoded signals from the subscribers through the passive optical coupler to the central office. Optical encoded signals from different subscribers are separated by a decoding process performed at the central office. All operations can be synchronized with a clock signal which is generated at the central office and recovered from the optical time-division multiplexed signal by the subscribers' equipment. The communication range can be extended inexpensively by using a single high-power light source at the central office while using relatively low-power light sources at the subscribers' equipment.

14 Claims, 10 Drawing Sheets

OTHER PUBLICATIONS

Iwabuchi et al., Faibagata WDM hikari kapura ("A Fiber-Type Optical Coupler"), Oki Technical Review, Issue 190, vol. 69, No. 2, Apr. 2002.

Lim et al., "Fault Localization in WDM Passive Optical Network by Reusing Downstream Light Sources", IEEE Photonics Technology Letters, vol. 17, No. 12, Dec. 2005.

* cited by examiner

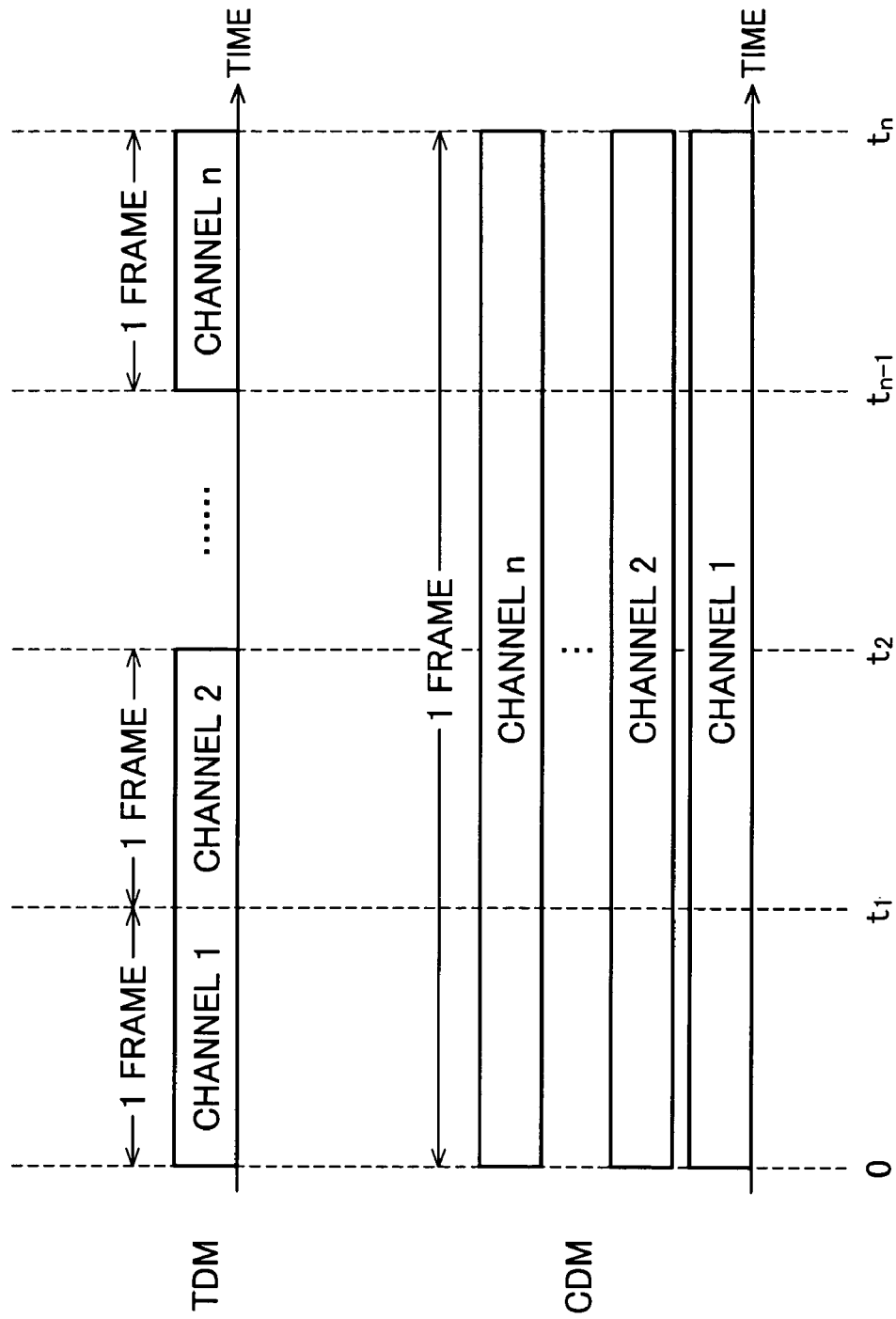

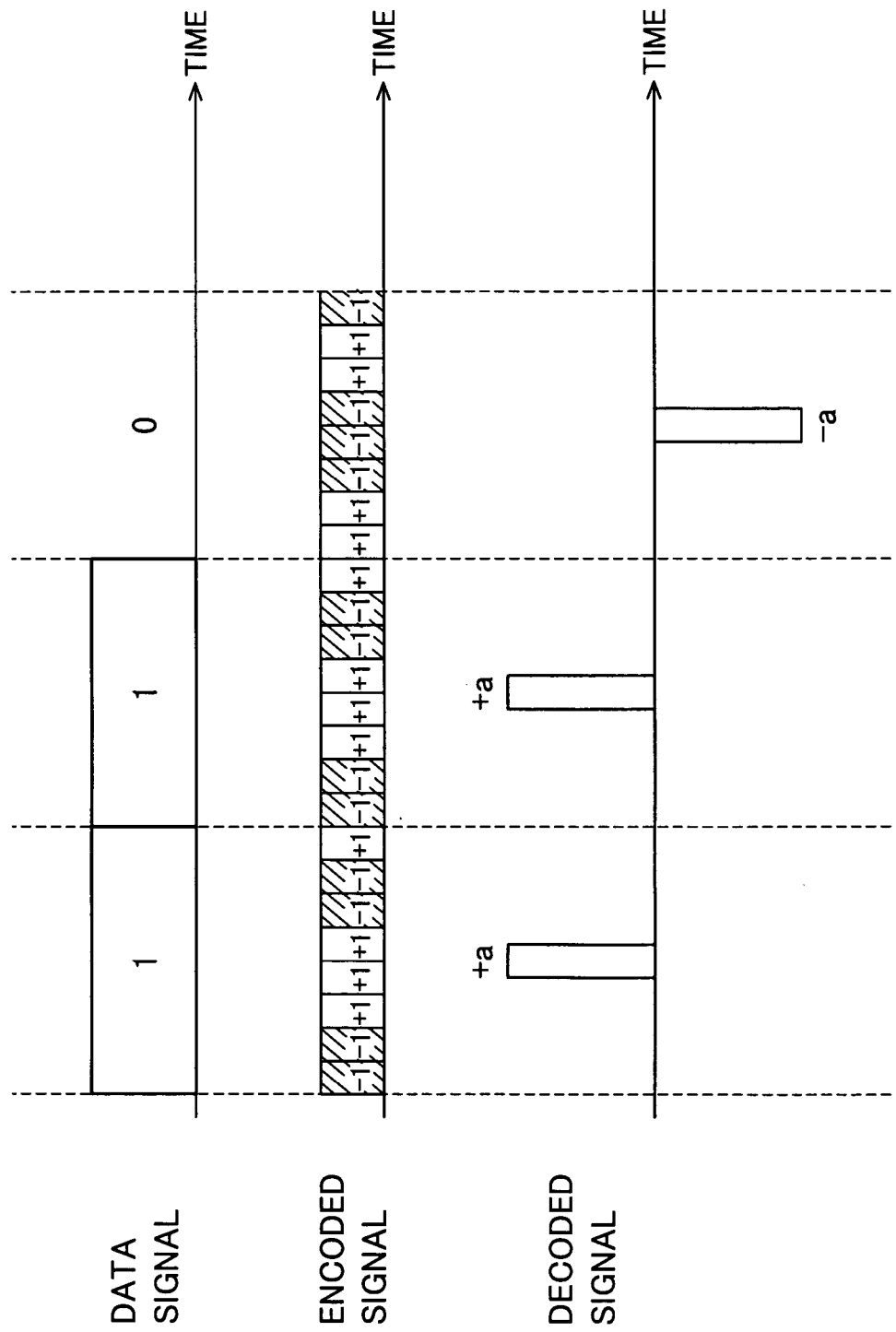

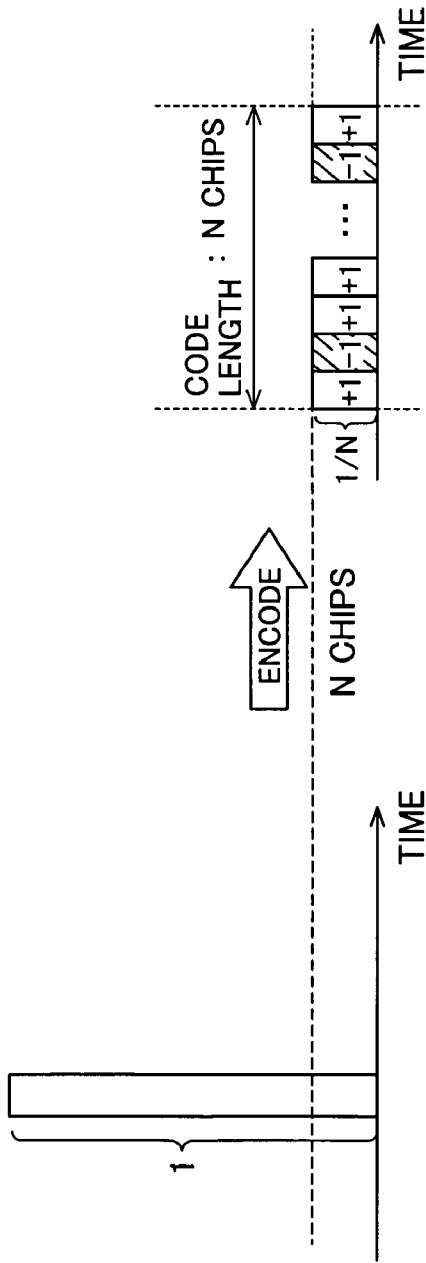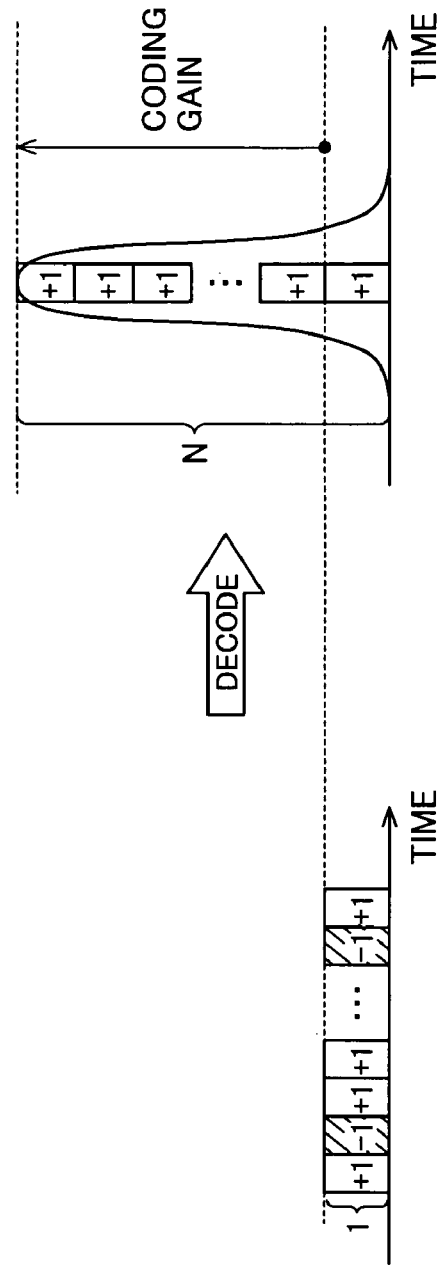
FIG.5A
FIG.5B

PASSIVE OPTICAL NETWORK COMMUNICATION METHOD AND SYSTEM

BACKGROUND OF THE INVENTION

1. Field of the Invention

The present invention relates to a passive optical network in which a plurality of subscribers are linked through optical channels and a passive optical coupler to a central office of, for example, a telecommunications company.

2. Description of the Related Art

A passive optical network (PON) typically links n optical network units (ONUs) installed on subscribers' premises to a single optical line termination unit (OLT) at the central office, where n is greater than one. The OLT is linked to the passive optical coupler by a single comparatively long optical fiber. The passive optical coupler is linked to the n ONUs through n comparatively short optical fibers. This type of network topology is attractive because it is considerably less expensive than a network that linked each ONU directly to the central office through a separate optical fiber would be. One description (in Japanese) can be found in the article 'GE-PON OLT/ONU isshin hikari toranshiba no kaihatsu' (Development of an optical transceiver for a single-fiber GE-PON OLT/ONU), Tanaka et al., Oki Technical Review, Issue 197, Vol. 71, No. 1, January 2004.

In a PON network, different wavelengths are used for the upstream signals sent from the ONUs to the OLT and the downstream signals sent from the OLT to the ONUs. Signals traveling in the same direction are split or combined at the passive optical coupler. An optical coupler of the fiber type with a bandpass filter function can be employed, as described in the article 'Faibagata WDM hikari kapura' (A fiber-type optical coupler) by Iwabata et al., Oki Technical Review, Issue 190, Vol. 69, No. 2, April 2002.

In addition, the signals sent to and received from the ONUs must be multiplexed. Three known methods of multiplexing are time-division multiplexing (TDM), wavelength-division multiplexing (WDM), and code-division multiplexing (CDM).

In TDM, different subscribers' signals or 'channels' are placed in different time slots so as not to collide. A description can be found in the article 'Implementation of a TDM Passive Optical Network for Subscriber Loop Application' by McGregor et al., J. Lightwave Technology, Vol. 7, No. 11, November 1989. TDM was the first type of multiplexing to be widely used in PON networks, but it suffers from the problem of short reach. Since each channel is compressed into a restricted time slot, its constituent signal pulses become very short. As the optical fiber length between the OLT and ONU increases, increasingly powerful and hence expensive photonic transmitting elements are needed to overcome optical attenuation in the fiber and produce detectable pulse energy at the receiving end. At the present state of the art, expensive photonic transmitting elements are required when the fiber length is more than twenty kilometers (20 km). A TDM PON serving n subscribers requires (n+1) of these expensive photonic elements.

In WDM, a different wavelength is assigned to each subscriber's signals. One study of this system appears in 'Fault Localization in WDM Passive Optical Network by Reusing Downstream Light Sources' by Lim et al., IEEE Photonics Technology Letters, Vol. 17, No. 12, December 2005. A problem with WDM is that as the number of subscribers increases, the wavelength channels assigned to different subscribers become closely spaced, and photonic transmitting elements with extremely high wavelength stability are needed to keep the channels separate. This wavelength stability also comes at a high price.

In CDM, the signals transmitted by different subscribers' ONUs are encoded in different ways. Although all subscribers' signals are transmitted at the same time on the same optical wavelength, if the codes are properly designed, different subscribers' signals can be separated at the receiving end. Because the entire time axis is available for carrying each subscriber's upstream and downstream signals, the signals can be generated by comparatively low-power photonic transmitting elements, even for comparatively long-distance transmission. Moreover, the problem of wavelength spacing does not arise, regardless of the number of channels. Descriptions of CDM systems can be found in Japanese Patent Application Publications No. 2001-512919 and No. 2004-282742.

A problem with the use of CDM in PON communication systems is that in order to recover data from the received signals, it is also necessary to recover a clock signal. Since the received signal is a combination of all n subscribers' signals, the received signal has more than n different amplitude (intensity) levels. Clock recovery in this situation is much more difficult than clock recovery from a signal with only two amplitude levels. Japanese Patent Application Publication No. 8-237239 describes a type of device that could be used for clock recovery in a CDM system, but the device is complex and expensive.

The difficulty of clock recovery also complicates the ranging measurement process in which the round-trip time of signals sent to and returned from each ONU is measured.

There is accordingly a need for a PON communication method and system that can serve a large number of subscribers without incurring high equipment costs for photonic transmitting elements or clock recovery devices, even if the OLT-ONU optical distance exceeds 20 km.

SUMMARY OF THE INVENTION

An object of the present invention is to enable PON communication between a central office and subscribers located at distances exceeding 20 km from the central office.

Another object of the invention is to reduce the equipment cost of a PON communication system.

Yet another object is to simplify synchronization in a PON communication system.

The invention provides a method of communicating in a PON communication system in which a central office termination unit and n subscriber termination units are linked by respective optical communication channels to a passive optical coupler, where n is an integer greater than one. The method includes:

generating an optical time-division multiplexed signal at the central office termination unit;

transmitting the optical time-division multiplexed signal through the passive optical coupler to all of the n subscriber termination units;

generating respective optical encoded signals at each of the n subscriber termination units; and transmitting the optical encoded signals through the passive optical coupler to the central office termination unit.

The optical time-division multiplexed signal is preferably more powerful than any of the optical encoded signals. The optical encoded signals may be combined at the passive optical coupler into an optical code-division multiplexed signal.

Each of the n subscriber termination units may recover a first clock signal from the received optical time-division multiplexed signal, and generate encoded data in synchronization with the recovered clock signal. The transmission timings of the encoded data may be adjusted by an amount determined at the central office.

The central office termination unit may generate a second clock signal, output the optical time-division multiplexed signal in synchronization with the second clock signal, and decode the optical encoded signals or code-division multiplexed signal received from the subscriber termination units in synchronization with the second clock signal.

The invention also provides a passive optical network communication system employing the invented communication method.

The central office termination unit in this system may include a time-division multiplexed signal generator that generates a time-division multiplexed signal in which data addressed to different subscriber termination units are placed in different time slots, a first photonic element for converting the time-division multiplexed signal to an optical time-division multiplexed signal, a second photonic element for converting an encoded optical signal received from the passive optical coupler to an encoded received signal, a decoding unit for decoding the encoded received signal, using different decoding rules to obtain data sent from different subscriber termination units, and a clock signal generator that generates the second clock signal.

Each subscriber termination unit may include a third photonic element that converts the optical time-division multiplexed signal to a received time-division multiplexed signal, a clock recovery unit for recovering the first clock signal from the received time-division multiplexed signal, a demultiplexer that extracts data addressed to the subscriber termination unit from the received time-division multiplexed signal in synchronization with the first clock signal, an encoder that generates encoded data in synchronization with the first clock signal, a timing adjuster that delays the transmission timing of the encoded data by an amount determined at the central office, and a fourth photonic element that converts the encoded data to the optical encoded signal.

The present invention extends the reach of PON communication beyond 20 km by using code-division multiplexed signals, which can be detected more easily than time-division multiplexed signals, on the upstream links.

Equipment cost is reduced because powerful photonic elements are not required at the subscriber termination units.

Synchronization is simplified because the clock signal generated at the central office termination unit can be recovered easily from the time-division multiplexed signal received at the subscriber termination units, and can be used to synchronize all operations at both the subscriber termination units and the central office termination unit.

BRIEF DESCRIPTION OF THE DRAWINGS

In the attached drawings:

FIG. 3 schematically illustrates time-division multiplexed and code-division multiplexed signals;

FIG. 4 schematically illustrates the encoding and decoding of data in a code-division multiplexed signal;

FIGS. 5A and 5B illustrate code length and coding gain in a code-division multiplexed signal;

DETAILED DESCRIPTION OF THE INVENTION

A detailed description of an embodiment the invention will now be given with reference to the attached drawings. The drawings are exemplary and schematic, and the invention is not limited to the configurations shown therein, or to the specific signal levels and other details shown or mentioned in the descriptions.

First the general configuration of a passive optical network communication system will be described. This description applies both to conventional PON communication systems and the novel systems to be described below.

Figure 1:
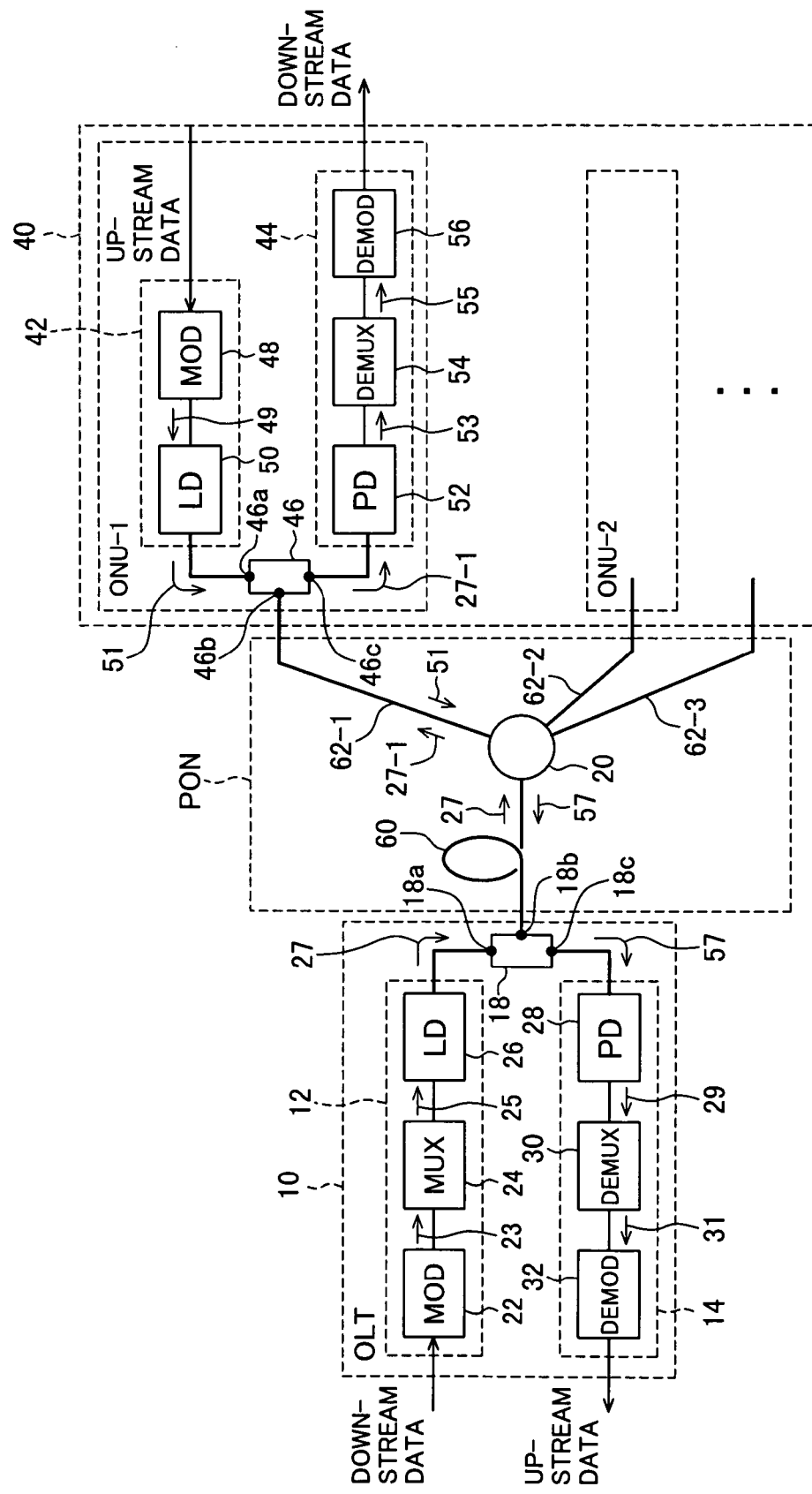
FIG. 1 is a block diagram showing the general configuration of a PON communication system.

Referring to FIG. 1, a PON communication system comprises a central office termination unit or optical line termination (OLT) 10 linked through optical fibers and a passive optical coupler 20 to an ONU group 40 comprising a plurality of subscriber termination units or optical network units ONU-1, ONU-2, . . . . The passive optical coupler 20, the optical fiber 60 linking the OLT 10 to the passive optical coupler 20, and the optical branch fibers 62-1, 62-2, . . . linking the passive optical coupler 20 to the optical network units ONU-1, ONU-2, . . . form a passive optical network (PON).

In the following description it will be assumed that there are n optical network units ONU-1, . . . , ONU-n and accordingly n optical branch fibers 62-1, . . . , 62-n, where n is an integer greater than one. Since all of the ONUs have the same internal configuration, much of the description will deal only with ONU-1 and its optical branch fiber 62-1, with the understanding that the description applies to the other ONUs as well.

The OLT 10 comprises a transmitting section 12 and a receiving section 14 linked through a wavelength-division multiplexing coupler or WDM coupler 18 to optical fiber 60. The transmitting section 12 of the OLT 10 generates the downstream signal, which is organized as a series of frames, each frame including a header and payload data, and sends the frames through the WDM coupler 18 to the ONUs. The receiving section 14 of the OLT 10 receives the combined upstream signals sent from the ONUs, and separates and demodulates the signals from different ONUs.

The upstream and downstream signals have different optical wavelengths. In a typical TDM system, for example, the upstream signals have a wavelength of 1.30 micrometers (1.30 μm) and the downstream signal has a wavelength of 1.48 μm. These wavelengths will be assumed below.

The transmitting section 12 in a TDM system comprises a modulating unit (MOD) 22, a multiplexer (MUX) 24, and a photonic transmitting element 26 such as a laser diode (LD). The modulating unit 22 receives a downstream data signal from, for example, a wide-area network switching apparatus (not shown), divides the data into frames, adds frame headers which indicate, for example, the particular ONU to which each frame is addressed, and sends the frames 23 to the multiplexer 24. Although only one modulating unit 22 is shown in FIG. 1, in actual OLTs there are generally n modulating units 22, each generating frames addressed to a different ONU. The multiplexer 24 multiplexes the frames addressed to different ONUs by placing each frame in a different time slot to generate an electrical time-division multiplexed signal 25 that drives the photonic transmitting element 26. The photonic transmitting element 26 converts this time-division multiplexed signal 25 to an optical time-division multiplexed signal 27 with the assumed wavelength of 1.48 μm.

If WDM or CDM is used instead of TDM, the transmitting section 12 employs different optical wavelengths or different codes instead of different time slots, but the result is still that the transmitting section 12 outputs a single downstream optical signal 27 to the WDM coupler 18.

The WDM coupler 18 has an input port 18a connected to the photonic transmitting element 26 in the transmitting section 12 of the OLT 10, an input-output port 18b connected to optical fiber 60, and an output port 18c connected to the receiving section 14 of the OLT 10. Internally, the WDM coupler 18 functions as a pair of optical bandpass filters that transmit light with a wavelength of 1.48 μm from the input port 18a to the input-output port 18b and light with a wavelength of 1.30 μm from the input-output port 18b to the output port 18c. The downstream optical signal 27 is accordingly routed through input port 18a, input-output port 18b, and optical fiber 60 to the passive optical coupler 20. An upstream optical signal 57 created at the passive optical coupler 20 by combining the upstream optical signals 51 from the n ONUs is routed through optical fiber 60, input-output port 18b, and output port 18c to the receiving section 14.

In a TDM system, the receiving section 14 comprises a photonic receiving element or photodetector (PD) 28, a demultiplexer (DEMUX) 30, and a demodulating unit (DEMOD) 32. The photonic receiving element 28 is a device such as a photodiode with peak sensitivity at a wavelength of 1.30 μm that converts the upstream optical signal 57 to an electrical time-division multiplexed signal 29. The demultiplexer 30 demultiplexes this time-division multiplexed signal 29 by extracting frames sent by different ONUs from different time slots, and outputs a demultiplexed signal 31 to the demodulating unit 32. The demodulating unit 32 deframes the demultiplexed signal 31 by removing the frame headers and outputs the upstream payload data. Although only one demodulating unit 32 is shown, in actual OLTs there are generally n demultiplexers 32, each receiving and processing a demultiplexed signal 31 originating from a different ONU.

In a WDM or CDM system, the receiving section 14 has a different configuration but performs the same basic functions of optical-to-electrical conversion, demultiplexing, and demodulation.

In the ONU group 40, ONU-1 comprises a transmitting section 42, a receiving section 44, and a WDM coupler 46 with an input port 46a connected to the transmitting section 42, an input-output port 46b connected to branch optical fiber 62-1, and an output port 46c connected to the receiving section 44.

The transmitting section 42 comprises, for example, a modulating unit 48 and a photonic transmitting element such as a laser diode 50. In a TDM system, the modulating unit 48 receives upstream data from user equipment (not shown), divides the data into frames, adds headers, and outputs the frames 49 in pre-assigned time slots to the photonic transmitting element 50. The photonic transmitting element 50 outputs a corresponding upstream optical signal 51 with a wavelength of 1.30 μm to the input port 46a of the WDM coupler 46. In WDM and CDM systems the operation is basically the same, except that the transmission timings are not confined to time slots.

The WDM coupler 46 transmits light with a wavelength of 1.30 μm from its input port 46a to its input-output port 46b, and transmits light with a wavelength of 1.48 μm from its input-output port 46b to its output port 46c. Accordingly, the upstream optical signal 51 is transmitted through the input port 46a, input-output port 46b, and optical branch fiber 62-1 to the passive optical coupler 20, and then through optical fiber 60 to the OLT 10.

In a TDM system, the receiving section 44 of ONU-1 comprises a photonic receiving element or photodetector 52, a demultiplexer 54, and a demodulating unit 56. These elements are similar to the corresponding elements in the receiving section 14 in the OLT 10, except that the peak sensitivity of the photodetector 52 is 1.48 μm, the demultiplexer 54 extracts only frames addressed to ONU-1 from the downstream time-division multiplexed signal 53 output by the photodetector 52, and there is only a single demodulating unit 56, which demodulates the frames 55 extracted by the demultiplexer 54 to obtain the received downstream data.

In a WDM or CDM system, the receiving section 44 has a different structure but performs the same basic functions of optical-to-electrical conversion, extraction of the signal addressed to ONU-1, and demodulation of this signal.

The passive optical coupler 20 splits the downstream optical signal 27 received from the OLT 10 into n optical branch signals. The branch signal 27-1 received by ONU-1 via optical branch fiber 62-1 is identical to the original downstream optical signal 27 but has only 1/n-th of the signal energy of the downstream optical signal 27. The other optical network units (ONU-2 . . . ) receive identical branch signals on other optical branch fibers 62-2, 62-3 . . . , each optical branch signal having 1/n-th of the signal energy of the downstream optical signal 27 but including the information addressed to all n ONUs. Each ONU processes only the information addressed to itself.

The passive optical coupler 20 also combines the optical signals transmitted by all n ONUs into a single upstream optical signal 57, which is sent to the OLT 10 on optical fiber 60. In a TDM system, the signals sent by different ONUs fit into different non-overlapping time slots and hence do not collide. The round-trip transmission time to each ONU is measured at the central office, time slots are assigned in a way that allows for the different optical lengths of the optical branch fibers 62-1, 62-2, . . . , and the ONUs transmit only in their assigned time slots. In WDM and CDM systems, different ONUs may transmit simultaneously.

Two PON communication systems embodying the present invention will now be described. Both systems employ TDM for downstream communication and CDM for upstream communication. In the second system, the OLT generates a clock signal for use in both transmitting and receiving, and the ONUs recover the clock signal from the downstream TDM signal and use it in generating their upstream signals.

Figure 2:
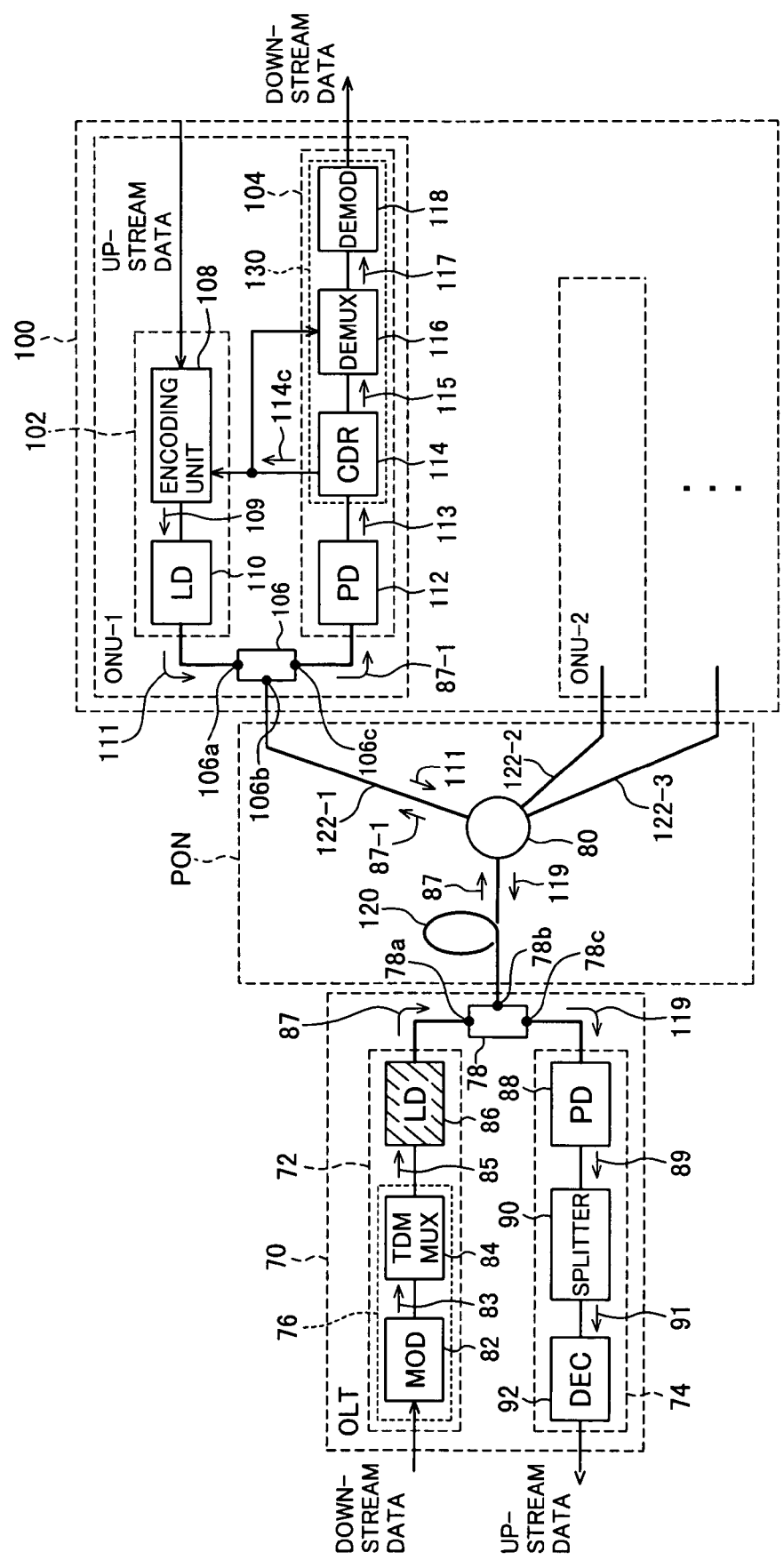
FIG. 2 is a block diagram showing the configuration of a PON communication system embodying the present invention.

Both systems have the general configuration shown in FIG. 2, comprising a central office termination unit or OLT 70, a passive optical coupler 80, an ONU group 100 with n subscriber termination units or ONUs (ONU-1, ONU-2, . . . ), an optical fiber 120 linking the OLT 70 to the passive optical coupler 80, and n optical branch fibers 122-1, 122-2, 122-3, . . . linking the passive optical coupler 80 to the n ONUs. The passive optical coupler 80 and optical fibers 120, 122-1, 122-2, 122-3, . . . constitute a PON. The description of ONU-1 given below applies to the other ONUs as well.

The OLT 70 comprises a transmitting section 72 and a receiving section 74 linked through a WDM coupler 78 to optical fiber 120. The transmitting section 72 transmits an optical time-division multiplexed signal 87 with a wavelength of 1.48 μm through the WDM coupler 78 and PON to the ONU group 100. The receiving section 74 receives and decodes an optical code-division multiplexed signal 119 with a wavelength of 1.30 μm that combines encoded optical signals 111 sent from the ONUs.

The transmitting section 72 includes a TDM signal generator 76 comprising n modulating units 82 and a TDM multiplexer 84, and a high-power photonic transmitting element 86. Only one of the n modulating units 82 is shown in FIG. 2. The TDM signal generator 76 generates a time-division multiplexed signal 85 from n received outgoing downstream data signals, each destined for a different ONU. More specifically, each modulating unit 82 receives one of the downstream data signals, divides it into frames of the proper length, adds frame headers, and sends the frames 83 to the TDM multiplexer 84. The TDM multiplexer 84 multiplexes the frames 83 destined to different ONUs by placing each frame in a different time slot to generate the downstream time-division multiplexed signal 85, which drives the high-power photonic transmitting element 86. The high-power photonic transmitting element 86 converts the downstream time-division multiplexed signal 85 to the optical time-division multiplexed signal 87.

The high-power photonic transmitting element 86 includes at least a high-power laser diode (LD) light source emitting light with a wavelength of 1.48 μm. 'High-power' (indicated by hatching) means that the laser diode emits light with more power than the laser diodes used in conventional PON communication systems designed to transmit signals for at most 20 km.

The WDM coupler 78 has an input port 78a connected to the high-power photonic transmitting element 86 in the transmitting section 72, an input-output port 78b connected to optical fiber 120, and an output port 78c connected to the receiving section 74. The WDM coupler 78 operates both as a coupler and as a pair of bandpass filters, transmitting light with a wavelength of 1.48 μm from the input port 78a to the input-output port 78b and transmitting light with a wavelength of 1.30 μm from the input-output port 78b to the output port 78c.

The receiving section 74 comprises a photonic receiving element or photodetector (PD) 88, a splitter 90, and n decoding (DEC) units 92, of which only one is shown. The photonic receiving element 88 has peak sensitivity at a wavelength of 1.30 μm and converts the optical code-division multiplexed signal 119 to an electrical code-division multiplexed signal or encoded received signal 89. The splitter 90 distributes identical copies 91 of the encoded received signal 89 to the decoding units 92. Each decoding unit 92 decodes its received copy 91 of the encoded received signal 89 by correlating this copy 91 with a predefined despreading code, different decoding units 92 using different despreading codes. Each decoding unit 92 thereby obtains data sent from a different ONU. The decoding units 92 also remove header information from the decoded signals, thereby obtaining received upstream data signals.

In the ONU group 100, ONU-1 comprises a transmitting section 102, a receiving section 104, and a WDM coupler 106 with an input port 106a connected to the transmitting section 102, an input-output port 106b connected to optical branch fiber 122-1, and an output port 106c connected to the receiving section 104.

The transmitting section 102 comprises, for example, an encoding unit 108 and a photonic transmitting element or laser diode 110. Operating in synchronization with a clock signal 114c obtained from the receiving section 104, the encoding unit 108 receives outgoing upstream data from user equipment (not shown), divides the data into frames of the proper length, adds header information, encodes the data by using a pre-assigned direct-sequence spreading code, and outputs an encoded signal 109 to the photonic transmitting element 110. The header information includes information identifying the start of a frame, and may include information used at the central office for ranging purposes, to measure the optical distance from the OLT 70 to ONU-1. The encoding unit 108 also delays the encoded signal 109 by an amount determined at the central office on the basis of the ranging measurement and specified in, for example, an overhead frame sent from the OLT to ONU-1. The photonic transmitting element 110 converts the encoded signal 109 to an optical encoded signal 111 with a wavelength of 1.30 μm, and sends the optical encoded signal 111 to the input port 106a of the WDM coupler 106.

The WDM coupler 106 transmits light with a wavelength of 1.30 μm from its input port 106a to its input-output port 106b, and transmits light with a wavelength of 1.48 μm from its input-output port 106b to its output port 106c. The optical encoded signal 111 output from the photonic transmitting element 110 is transmitted on optical branch fiber 122-1 to the passive optical coupler 80, where it is combined with optical encoded signals from other ONUs to create the optical code-division multiplexed signal 119 that is transmitted on optical fiber 120 to the OLT 70. The optical encoded signals sent by different ONUs do not occupy separate time slots; all n ONUs may transmit simultaneously. The delays performed by the encoding units 108 in the ONUs are calculated at the central office so that the optical encoded signals from different ONUs are mutually synchronized at the passive optical coupler 80.

The receiving section 104 comprises a photonic receiving element or photodetector (PD) 112 and a TDM demultiplexing unit 130. The demultiplexing unit 130 includes a clock/data recovery (CDR) unit 114, a TDM demultiplexer 116, and a demodulating unit 118. The photonic receiving element 112, which has peak sensitivity at a wavelength of 1.48 μm, converts an optical time-division multiplexed signal 87-1 to a received time-division multiplexed signal 113. The clock/data recovery unit 114 recovers the clock signal 114c from the received time-division multiplexed signal 113, and passes the received time-division multiplexed signal without alteration to the TDM demultiplexer 116. Recovery of a clock signal from a TDM signal is a known art, and inexpensive integrated circuits with this function are commercially available.

Operating in synchronization with the clock signal 114c, the TDM demultiplexer 116 extracts the frames addressed to ONU-1 from the received time-division multiplexed signal 115 output by the clock/data recovery unit 114. The demodulating unit 118 demodulates the demultiplexed signal 117 extracted by the TDM demultiplexer 116 by removing header information, for example, to obtain the received downstream data.

The passive optical coupler 80 splits the optical time-division multiplexed signal 87 received from the OLT 70 into n identical branch signals. Optical network unit ONU-1 receives one of these n optical time-division multiplexed branch signals 87-1 via optical branch fiber 122-1. The optical time-division multiplexed branch signal 87-1 has 1/n-th of the signal energy of the optical time-division multiplexed signal 87 that reaches the passive optical coupler 80 on optical fiber 120. The other optical network units (ONU-2 . . . ) receive similar branch signals via other optical branch fibers 122-2, 122-3, . . . , each branch signal having 1/n-th of the signal energy of the optical time-division multiplexed signal 87 but including frames addressed to all n ONUs. Each ONU processes only the frames addressed to itself.

The code-division multiplexing scheme used in the present embodiment will now be described in more detail.

FIG. 3 compares the code-division multiplexed (CDM) signal with the time-division multiplexed (TDM) signal in the present embodiment.

In the TDM signal, frames addressed to the n ONUs are transmitted in different time slots: a frame for ONU-1 occupies the slot from time 0 to time $t_1$, a frame for ONU-2 occupies the slot from time $t_1$, to time $t_2$, and a frame for ONU-n occupies the slot from time $t_{n-1}$ to time $t_n$. (Guard bands may be present between the time slots but are not shown.) Each time slot corresponds to a different one of the n channels between the OLT 70 and the ONU group 100.

In the CDM signal, the frame sent from each ONU occupies the entire time interval from time $t_0$ to time $t_n$, and different channels are distinguished by the use of different codes. The frames transmitted by different ONUs preferably start and end at the same times, as shown.

The direct-sequence CDM coding and decoding scheme used in the present embodiment is illustrated schematically in FIG. 4 for an upstream data signal including three consecutive bits with values of '1', '1', and '0'. This is the signal input to the encoding unit 108 in FIG. 2.

The encoding unit 108 encodes each bit to a series of eight 'chips' with binary values represented in the drawing by −1 and +1. Conceptually, the coding process is carried out by converting the '1' and '0' bit values to +1 and −1, respectively, and multiplying each bit value by the spreading code (−1, −1, +1, +1, +1, −1, −1, +1). In practice, the operation is performed by an exclusive logical NOR (EXNOR) gate, equivalent to an exclusive-OR (EXOR) gate followed by an inverter. The eight chips form what is referred to as a 'symbol', encoding one bit of data.

The data are decoded by correlating the received CDM signal, which includes n encoded signals, with the same sequence (−1, −1, +1, +1, +1, −1, −1, +1), which now functions as a despreading code. That is, the values of corresponding chips in the received signal and the despreading code are multiplied together, and the products are summed. As shown at the bottom of FIG. 4, the result is either +a or −a, depending on whether the original data were '1' or '0'. The value of a depends on the code length and other factors. The correlation process can be carried out by an EXNOR gate and an adder in the decoding unit 92.

By using matching spreading and despreading codes, the encoding unit 108 and decoding unit 92 operate as a pair of matched filters. Different spreading codes are assigned to the encoding units 108 in different ONUs, and each decoding unit 92 uses a despreading code matching the spreading code of the corresponding ONU. The spreading codes are designed so that if the spreading and despreading codes do not match, the result of the correlation process is zero (0), or substantially zero. By decoding the received CDM signal, each decoding unit 92 therefore obtains the data transmitted by the corresponding ONU without interference, or with negligible interference, from the signals transmitted by other ONUs.

FIG. 5A illustrates the concepts of code length and energy. A data pulse with unit energy is encoded as a series of N chips, each having an energy of 1/N. The parameter N is the code length (in FIG. 4, N=8). Since the energy is distributed over N chips instead of being concentrated in a single pulse, the power level of the chip signal is reduced by a factor of N. At the same time, the chip rate (the number of chips per second) is N times higher than the original data rate (the number of data bits per second).

Referring to FIG. 5B, when a series of N chips, each having unit energy, is correlated to obtain a decoded signal, the decoded signal is represented by a pulse that includes the energy of all N chips. That is, the power level of the decoded signal is increased by a factor of N over the power level of the received chip signal. This increase in signal power is referred to as the coding gain.

In practice, the optical encoded signal is an on-off signal and the energy levels shown in FIGS. 5A and 5B are average energy levels of the N chips, but the principle remains the same. Because of the coding gain, the optical encoded signal transmitted by each ONU can be received successfully even if its power level is only 1/N of the power level that would be required for reception of a non-encoded signal such as a TDM signal. For this reason, the laser diodes or other light sources used in the ONUs in FIG. 2 need have only a fraction of the power rating of the light source used in the OLT 70.

Figure 6:
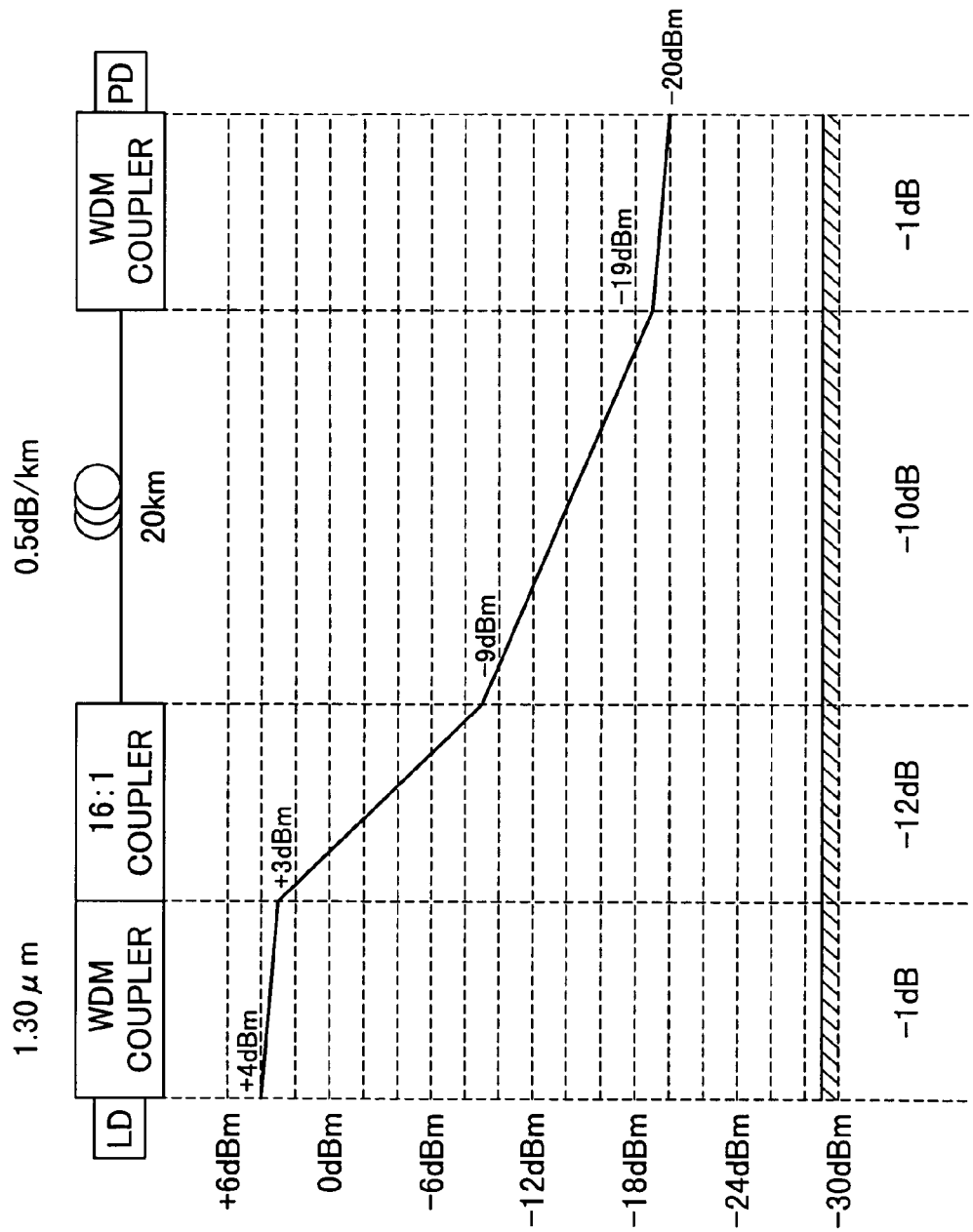
FIG. 6 is a signal level diagram illustrating upstream time-division multiplexed transmission over a 20-km optical link.
Figure 7:
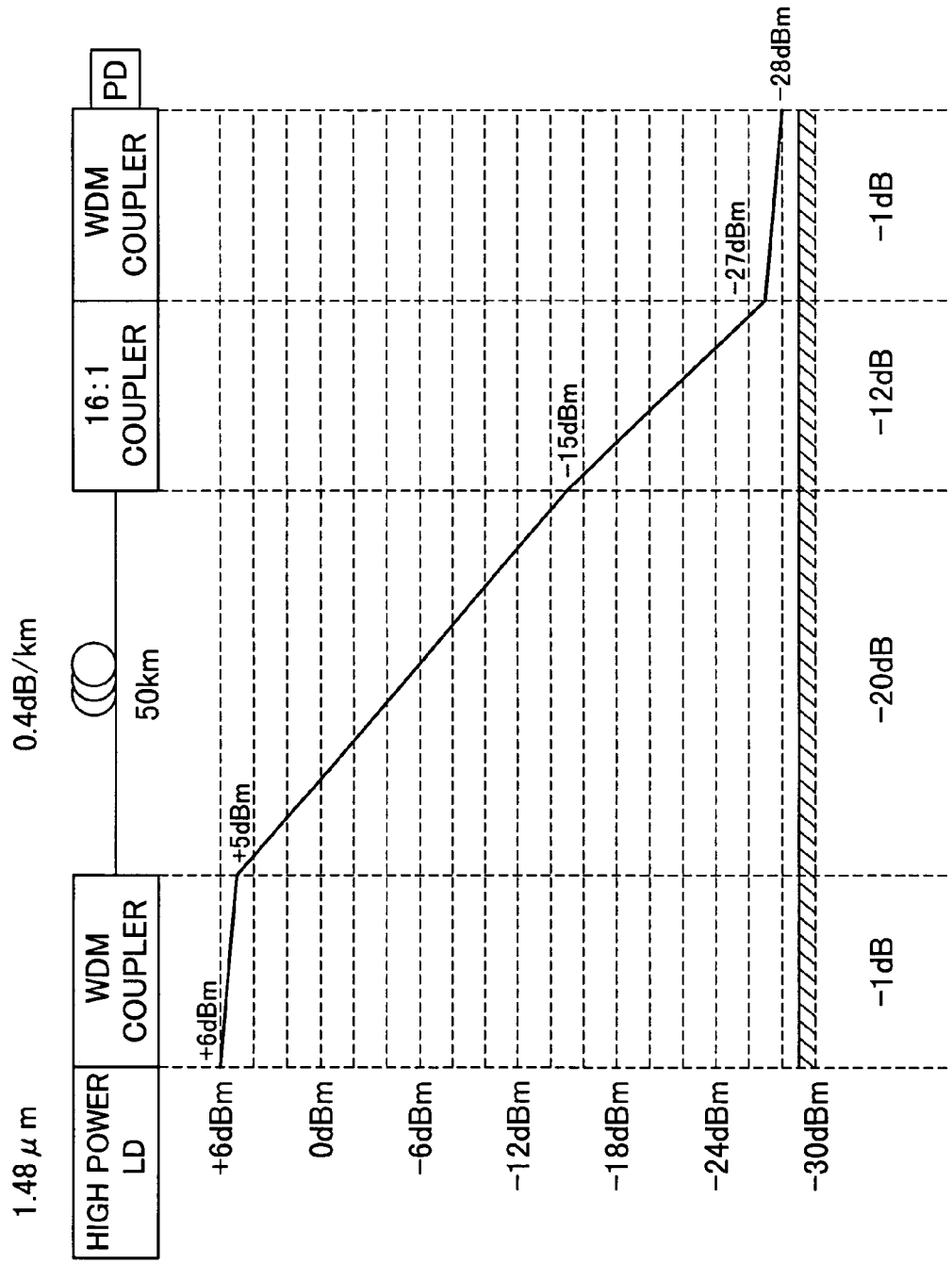
FIG. 7 is a signal level diagram illustrating downstream time-division multiplexed transmission over a 50-km optical link.
Figure 8:
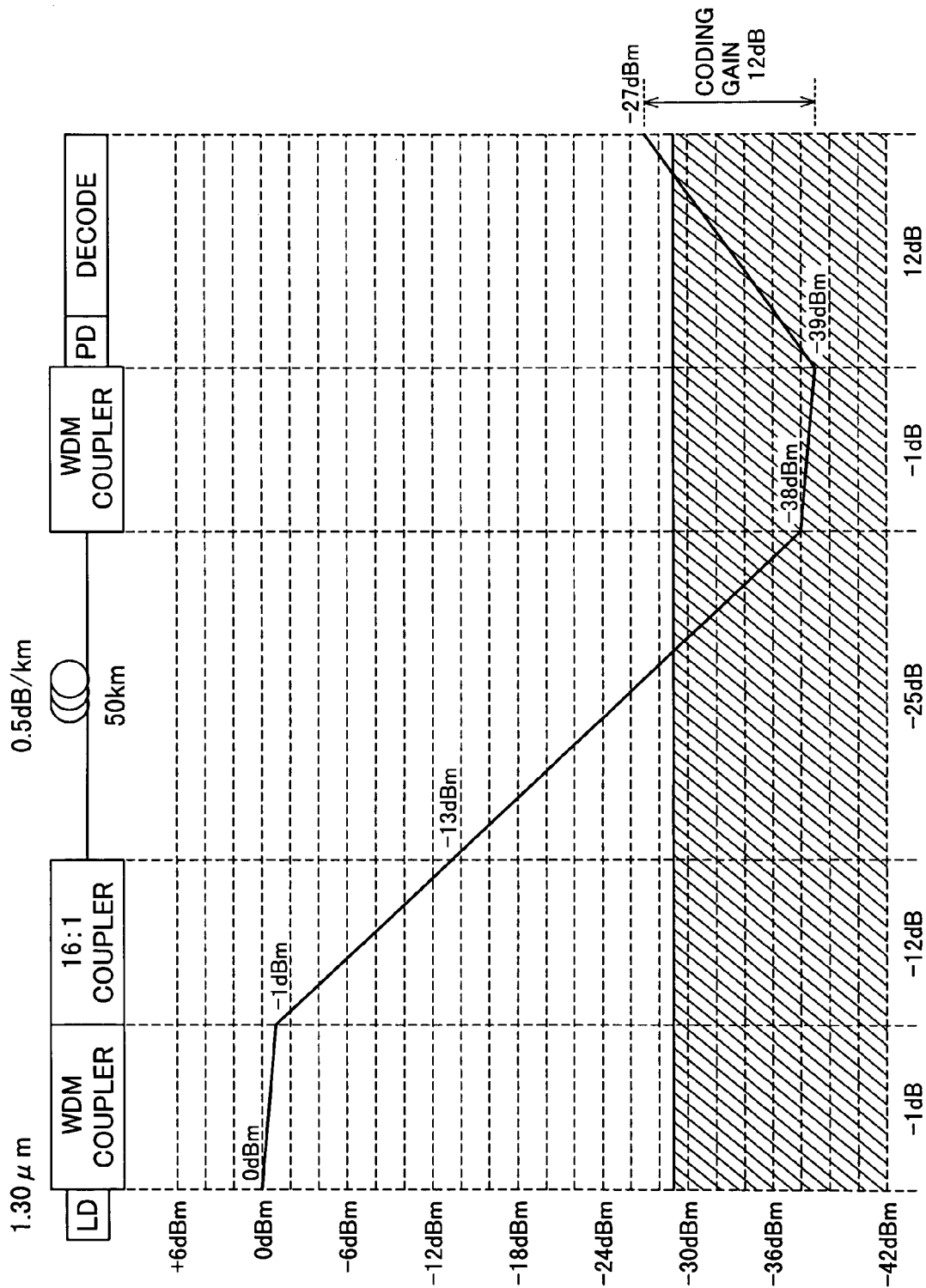
FIG. 8 is a signal level diagram illustrating upstream code-division multiplexed transmission over a 50-km optical link.

To illustrate this point further, FIGS. 6, 7, and 8 show the power levels of various types of optical signals transmitted over a passive optical network.

FIG. 6 shows typical power levels for a conventional PON with sixteen ONUs, employing TDM for upstream transmission over a distance of 20 km. The laser diodes used in the ONUs of this type of network are relatively inexpensive devices with average output power ratings of minus one to plus four milliwatt decibels (−1 dBm to +4 dBm). In FIG. 6, the assumed average output power is +4 dBm (approximately 2.51 mW). A loss of one decibel in the ONU's WDM coupler reduces the power level to +3 dBm. At the 16:1 passive optical coupler, there is a further loss of twelve decibels, reducing the power level to −9 dBm. An optical signal with a wavelength of 1.30 μm is attenuated by 0.5 decibel per kilometer (0.5 dB/km) in the optical fibers. As the transmission distance is 20 km, there is a loss of ten decibels in the optical fibers, reducing the power level to −19 dBm. After an additional one-decibel loss in the OLT's WDM coupler, the signal arrives at the photodetector (PD) in the OLT with a power level of −20 dBm.

If the transmission distance were 50 km, attenuation in the optical fibers would increase to twenty-five decibels, and the received power level would be −34 dBm at the WDM coupler and −35 dBm at the photodetector in the OLT.

In a TDM PON communication system, the minimum necessary received power level is considered to be about −29 dBm, as indicated by hatching in the drawings. Accordingly, in a conventional TDM PON communication system, communication is possible over a distance of 20 km but not over a distance of 50 km.

FIG. 7 shows corresponding power levels for the TDM downstream signal transmitted from the OLT 70 to the ONU group 100 in the present embodiment if the transmission distance is 50 km. The number of ONUs is again sixteen (n=16). The high-power laser diode used in the OLT 70 has an output power of +6 dBm, which is reduced to +5 dBm by the WDM coupler 78 in the OLT. For a signal with a wavelength of 1.48 μm, the attenuation in the optical fiber is only 0.4 dB/km. Over 50 km this produces a twenty-decibel attenuation, and there is also a twelve-decibel attenuation in the passive optical coupler 80 and a one-decibel attenuation in the WDM coupler at the ONU. The power level of the signal received by the photodetector in the ONU is accordingly −28 dBm (5−20−12−1=−28). This still exceeds the minimum necessary level (−29 dBm), indicating that if the high-power laser diode in the OLT has a rating of +6 dBm, the downstream TDM signal can be received by ONUs up to 50 km away.

FIG. 8 shows the corresponding power levels for the CDM upstream signal transmitted from an ONU to the OLT 70 in the present embodiment, again assuming a transmission distance of 50 km and a 16:1 passive optical coupler (n=16). A code length of sixteen chips is used; this code length permits the use of N mutually non-interfering spreading codes.

The laser diode in the ONU has an output power of 0 dBm, near the low end of the conventional range from −1 dBm to +4 dBm. This 0-dBm output level is reduced by one decibel to −1 dBm in the WDM coupler 106 in the ONU, and by twelve decibels to −13 dBm in the passive optical coupler 80. Since the signal has a wavelength of 1.30 μm, it is attenuated by 0.5 dB/km in the 50 km of optical fiber, producing a further twenty-five-decibel reduction. The signal received at the WDM coupler 78 in the OLT 70 accordingly has a power level of −38 dBm, which the WDM coupler reduces to −39 dBm.

After opto-electric conversion in the photodetector 88 in the OLT 70, however, the CDM signal is decoded by the decoding unit 92, producing a coding gain of twelve decibels (the power level increases by a factor of sixteen). The final power level is accordingly −27 dBm, which exceeds the minimum necessary level of −29 dBm, indicating that even without the use of a high-power light source in the ONU, the encoded signal transmitted upstream by the ONU can be received at an OLT fifty kilometers away.

The system in FIG. 2 accordingly enables a PON to provide communication over distances considerably exceeding the conventional 20-km limit. Although one high-power light source is required at the OLT 70, conventional lower-power light sources can be used at the ONUs, so the increased communication range is obtained without the need for expensive photonic transmitting elements in the ONUs.

The second system embodying the present invention will be described with reference to FIG. 9, which illustrates the central office termination unit (OLT), and FIG. 10, which illustrates a subscriber termination unit (ONU). The PON itself is the same as in FIG. 2, including an n:1 passive optical coupler, where n is the number of ONUs.

Figure 9:
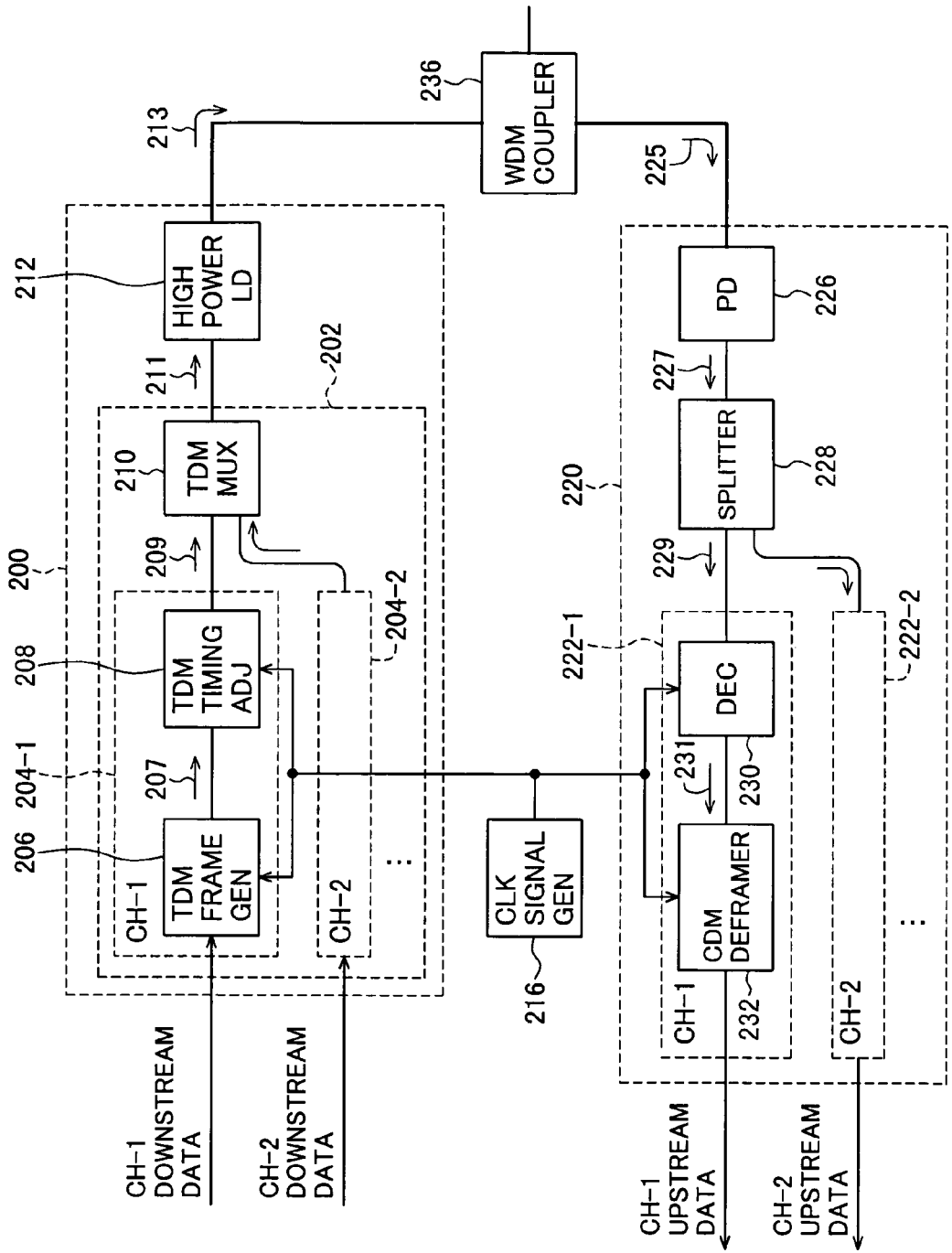
FIG. 9 is a block diagram of the central office termination unit in another PON communication system embodying the present invention.

The OLT in FIG. 9 comprises a transmitting section 200 and a receiving section 220 connected to a WDM coupler 236 similar to the WDM coupler 78 in FIG. 2, and a clock signal generator 216 that generates an OLT clock signal to which all signals in the PON communication system are synchronized. The OLT clock signal provides chip, symbol, bit, and frame synchronization.

The transmitting section 200 comprises a TDM signal generator 202 and a high-power photonic transmitting element such as a laser diode (LD) 212. The TDM signal generator 202 comprises n modulating units 204-1, 204-2, . . . , each including a TDM frame generator 206 and a TDM timing adjuster 208, and a TDM multiplexer 210 to which all n modulating units are connected. Modulating unit 204-1 receives a first-channel (CH-1) downstream data signal destined for ONU-1, modulating unit 204-2 receives a second-channel (CH-2) downstream data signal destined for ONU-2, and so on. In each modulating unit, the TDM frame generator 206 divides the data signal into frames of the proper length for time-division multiplexing, adds headers, and outputs the resulting TDM frames 207 to the TDM timing adjuster 208 in synchronization with the OLT clock signal. The TDM timing adjuster 208, also operating in synchronization with the OLT clock signal, delays each TDM frame 207 by a predetermined amount, which differs for each channel, to align the frames 207 with their assigned time slots, and outputs the delayed TDM frame 209 to the TDM multiplexer 210. The TDM multiplexer 210 combines the TDM frames 209 on the n channels into a single time-division multiplexed signal 211 that drives the high-power photonic transmitting element 212. The high-power photonic transmitting element 212 converts the time-division multiplexed signal 211 to an optical time-division multiplexed signal 213, which is sent to the WDM coupler 236.

The receiving section 220 comprises a photonic receiving element or photodetector (PD) 226, a splitter 228, and n channel decoding units 222-1, 222-2, . . . , each channel decoding unit including a decoder 230 and a CDM deframer 232. The photonic receiving element 226 converts the optical code-division multiplexed signal 225 received from the WDM coupler 236 to an electrical code-division multiplexed signal 227. The splitter 228 distributes n identical copies 229 of the code-division multiplexed signal 227 to the channel decoding units 222-1, 222-2, . . . . The decoder 230 in each decoding unit, operating in synchronization with the OLT clock signal, decodes the received copy 229 of the code-division multiplexed signal 227, using a despreading code pre-assigned to its channel. The CDM deframer 232, also operating in synchronization with the OLT clock signal, removes header information from the decoded signal 231 output by the decoder 230, thereby obtaining the received data signal for the corresponding channel.

Figure 10:
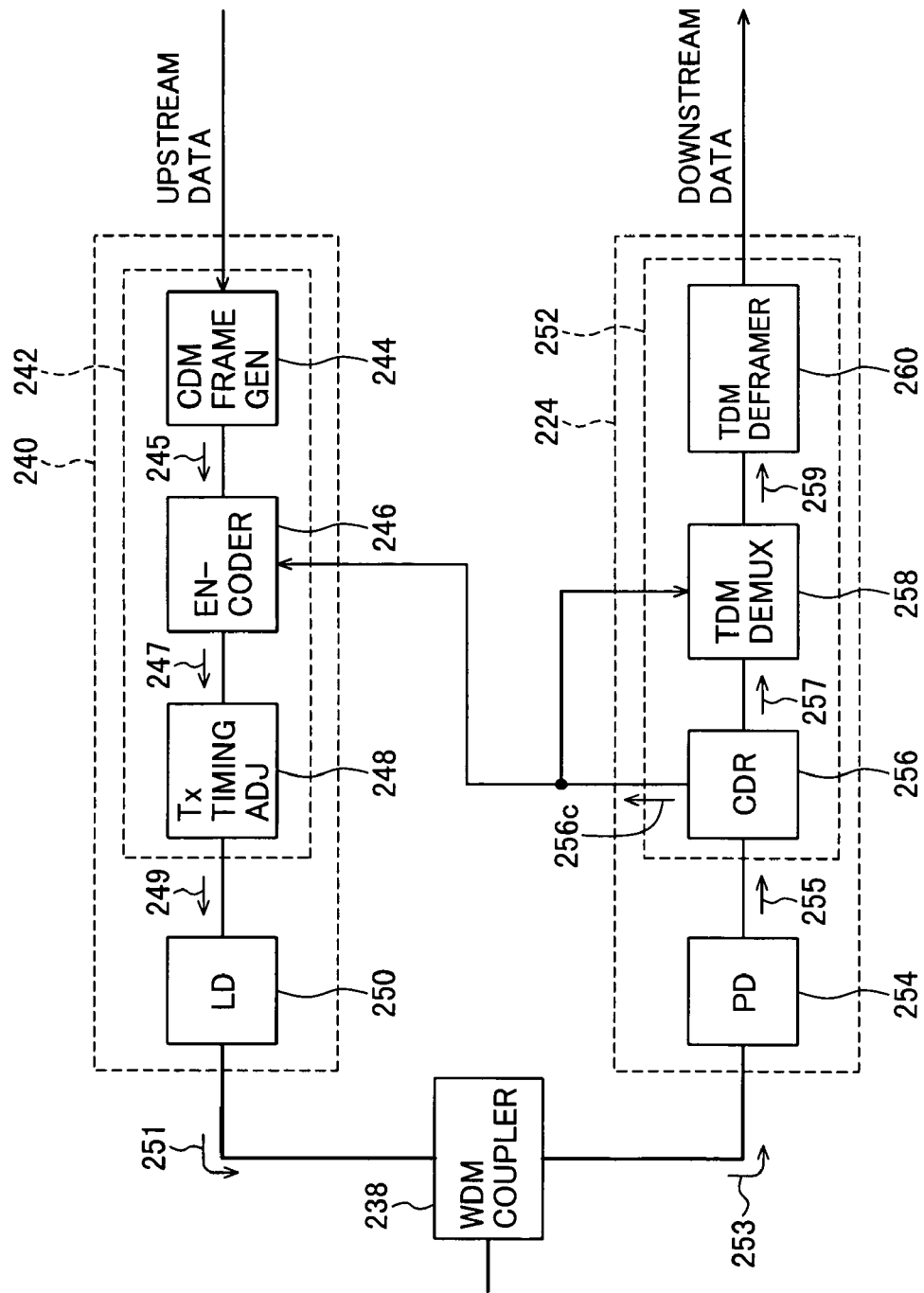
FIG. 10 is a block diagram of a subscriber termination unit in the PON communication system illustrated in FIG. 9.

The ONU in FIG. 10 comprises a receiving section 224 and a transmitting section 240. The transmitting section 240 comprises an encoding unit 242 and a photonic transmitting element such as a laser diode (LD) 250. The encoding unit 242 comprises a CDM framer 244, an encoder 246, and a transmission timing adjuster 248.

The CDM framer 244 receives an upstream data signal from user equipment (not shown), divides the received data signal into frames of a suitable length, adds header information, and outputs the resulting frames 245 to the encoder 246. The encoder 246 encodes each frame, using the spreading code pre-assigned to the ONU, and outputs the resulting encoded signal 247 to the transmission timing adjuster 248 in synchronization with a clock signal 256c received from the receiving section 224. The transmission timing adjuster 248 delays the encoded signal 247 by an amount determined at the central office, and outputs a delayed encoded signal 249 that drives the photonic transmitting element 250. The photonic transmitting element 250 converts the delayed encoded signal 249 to an optical encoded signal 251, which is sent through the WDM coupler 238 to the PON (not shown).

The receiving section 224 comprises a demultiplexing unit 252 and a photonic receiving element or photodetector (PD) 254. The demultiplexing unit 252 comprises a clock/data recovery unit 256, a TDM demultiplexer 258, and a TDM deframer 260. The photonic receiving element 254 receives a downstream optical time-division multiplexed signal 253 from the WDM coupler 238 and converts it to an electrical time-division multiplexed signal 255. The clock/data recovery unit 256 recovers the clock signal 256c from the received time-division multiplexed signal 255, and passes the time-division multiplexed signal without alteration to the TDM demultiplexer 258. The TDM demultiplexer 258, operating in synchronization with the recovered clock signal 256c, takes the frames 259 in the time slots corresponding to the ONU's channel from the time-division multiplexed signal 257 received from the clock/data recovery unit 256. The demultiplexing unit 252 removes header information from these frames 259 to obtain the received data signal.

The clock signal 256c recovered by the clock/data recovery unit 256 corresponds to the OLT clock signal in the OLT, with a delay produced by propagation from the OLT to the ONU through the PON. The optical encoded signal 251 output by the transmitting section 240 experiences a similar delay en route from the ONU to the OLT. The central office determines the total round-trip delay by a ranging measurement, and assigns a compensating delay to the transmission timing adjuster 248 in each ONU so that the optical encoded signals transmitted by all ONUs arrive at the OLT in mutual synchronization, and in synchronization with the OLT clock signal at the OLT. That is, the sum of the round-trip delay and the delay set in the transmission timing adjuster 248 is the same for all n ONUs, and is a known multiple of the clock period of the clock signal generator 216.

Because of this synchronization, in the optical code-division multiplexed signal 225 received by the OLT, the chip boundaries of the signals contributed by all n ONUs are mutually aligned at timings having a known relation to the OLT clock signal. Moreover, the N-chip symbols representing bits of transmitted data all start and end simultaneously. Consequently, the decoders 230 in the OLT do not have to perform a lengthy timing acquisition process to synchronize their operations with the received encoded signal. The clock/data recovery units 256 in the ONUs preferably recover symbol and frame timing information as well as chip timing information, so that the decoders 230 can use the OLT clock signal to acquire chip, symbol, and frame synchronization immediately without the need for any timing acquisition process at all.

The PON communication system illustrated in FIGS. 9 and 10 accordingly provides the same advantage of lengthened reach as the system described in FIGS. 2 to 8, with the additional advantage of simplified synchronization. In particular, there is no need to employ a complex and expensive CDR circuit to recover clock information from a multi-level signal.

The present invention is not limited to the direct-sequence code-division multiplexing scheme illustrated in FIGS. 4, 5A, and 5B. Other types of code-division multiplexing can be used instead.

The photonic transmitting elements are not limited to laser diodes. For example, a combination of a light source and an optical modulating unit may be used instead.

The upstream signals do not necessarily have to be divided into frames.

The upstream signals transmitted by different ONUs do not necessarily have to be mutually synchronized.

The invention can also be practiced in hybrid systems that combine time-division and wavelength-division multiplexing on the downstream link and/or combine code-division and wavelength-division multiplexing on the upstream link.

Those skilled in the art will recognize that further variations are possible within the scope of the invention, which is defined in the appended claims.

What is claimed is:

1. A method of communicating in a passive optical network communication system in which a central office termination unit and n subscriber termination units are linked by respective optical communication channels to a passive optical coupler, n being an integer greater than one, the method comprising:
   generating an optical time-division multiplexed signal at the central office termination unit;
   transmitting the optical time-division multiplexed signal through the passive optical coupler to all of the n subscriber termination units;
   generating respective optical encoded signals at each of the n subscriber termination units;
   transmitting the optical encoded signals through the passive optical coupler to the central office termination unit;
   combining the optical encoded signals from the n subscriber termination units at the passive optical coupler into an optical code-division multiplexed signal;
   transmitting the optical code-division multiplexed signal to the central office termination unit;
   generating, at the central office termination unit, a time-division multiplexed signal in which data addressed to different ones of the n subscriber termination units are placed in different time slots;
   converting the time-division multiplexed signal to the optical time-division multiplexed signal;
   converting the optical code-division multiplexed signal to an encoded received signal at the central office termination unit;
   decoding the encoded received signal by using different decoding rules to obtain data sent from different ones of the n subscriber termination units;
   converting the optical time-division multiplexed signal to a received time-division multiplexed signal at each one of the n subscriber termination units;
   recovering a first clock signal from the received time-division multiplexed signal at said each one of the n subscriber termination units;
   extracting the data addressed to said each one of the n subscriber termination units from the received time-division multiplexed signal in synchronization with the first clock signal;
   generating encoded data in synchronization with the first clock signal at said each one of the n subscriber termination units; and
   converting the encoded data, at said each one of the n subscriber termination units, to one of the optical encoded signals.

2. The method of claim 1, wherein the optical time-division multiplexed signal is more powerful than any of the optical encoded signals.

3. The method of claim 1, wherein the optical communication channels comprise respective optical fibers.

4. The method of claim 1, further comprising generating a second clock signal at the central office termination unit, wherein the time-division multiplexed signal is generated in synchronization with the second clock signal and the encoded received signal is decoded in synchronization with the second clock signal.

5. The method of claim 4, wherein generating the time-division multiplexed signal at the central office termination unit further comprises:
   dividing the data addressed to different ones of the n subscriber termination units into frames in synchronization with the second clock signal;
   adding header information to the frames;
   outputting the frames at different timings in synchronization with the second clock signal; and
   combining the frames output at the different timings to form the time-division multiplexed signal.

6. The method of claim 4, wherein decoding the encoded received signal further comprises:
   splitting the encoded received signal into n copies;
   decoding each copy of the encoded received signal according to a different one of the decoding rules in synchronization with the second clock signal; and
   removing header information from the decoded copies of the encoded received signal in synchronization with the second clock signal.

7. The method of claim 1, further comprising delaying a transmission timing of the optical encoded signal at each one of the n subscriber termination units by an amount specified from the central office termination unit.

8. A passive optical network communication system in which a central office termination unit and n subscriber termination units are linked by respective optical communication channels to a passive optical coupler that transmits a first optical signal from the central office termination unit to the n subscriber termination units and transmits second optical signals from the n subscriber termination units to the central office termination unit, n being an integer greater than one, wherein:

the first optical signal is an optical time-division multiplexed signal;

the second optical signals are optical encoded signals;

the passive optical coupler combines the second optical signals from the n subscriber termination units into an optical code-division multiplexed signal which is sent to the central office termination unit, the central office termination unit including a time-division multiplexed signal generator that generates a time-division multiplexed signal in which data addressed to different ones of the n subscriber termination units are placed in different time slots, a first photonic element for converting the time-division multiplexed signal to the first optical signal, a second photonic element for converting the optical code-division multiplexed signal to an encoded received signal, and a decoding unit for decoding the encoded received signal by using different decoding rules to obtain data sent from different ones of the n subscriber termination units; and each one of the n subscriber termination units includes a third photonic element for converting the first optical signal to a received time-division multiplexed signal, a recovery unit for recovering a first clock signal from the received time-division multiplexed signal, a demultiplexer operating in synchronization with the first clock signal to extract the data addressed to said one of the n subscriber termination units from the received time-division multiplexed signal, an encoder operating in synchronization with the first clock signal to generate an encoded signal, and a fourth photonic element for converting the encoded signal to one of the second optical signals.

9. The passive optical network communication system of claim 8, wherein the first optical signal is more powerful than any of the second optical signals.

10. The passive optical network communication system of claim 8, wherein the optical communication channels comprise respective optical fibers.

11. The passive optical network communication system of claim 8, wherein the central office termination unit further includes a clock signal generator for generating a second clock signal, and the time-division multiplexed signal generator and the decoding unit operate in synchronization with the second clock signal.

12. The passive optical network communication system of claim 11, wherein the time-division multiplexed signal generator further includes:

a plurality of frame generators operating in synchronization with the second clock signal to divide the data addressed to different ones of the n subscriber termination units into frames and add header information to the frames;

a plurality of multiplexing timing adjusters for outputting the frames at different timings; and a time-division multiplexer for combining the frames output by the plurality of multiplexing timing adjusters to form the time-division multiplexed signal.

13. The passive optical network communication system of claim 11, wherein the decoding unit further includes:

a plurality of channel decoding units, each channel decoding unit including a decoder operating in synchronization with the second clock signal according to one of the decoding rules and a deframer operating in synchronization with the second clock signal to remove header information; and a splitter for distributing copies of the encoded received signal to the plurality of channel decoding units.

14. The passive optical network communication system of claim 8, wherein each one of the n subscriber termination units further includes a transmission timing adjuster for delaying a transmission timing of the encoded data by an amount specified by the central office termination unit.

* * * * *